L. H. PERLMAN.
WHEEL.
APPLICATION FILED FEB. 23, 1917.

1,307,268.

Patented June 17, 1919.
3 SHEETS—SHEET 1.

Witness
E. H. Wagner.
C. H. Fesler

Inventor
Louis H. Perlman

By Edgar M. Kitchin
his Attorney

L. H. PERLMAN.
WHEEL.
APPLICATION FILED FEB. 23, 1917.
1,307,268.
Patented June 17, 1919.
3 SHEETS—SHEET 2.
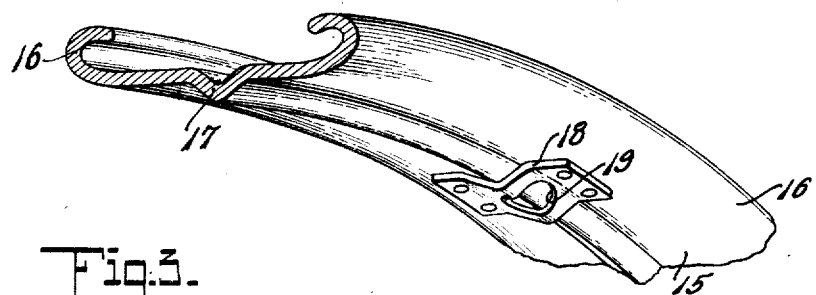
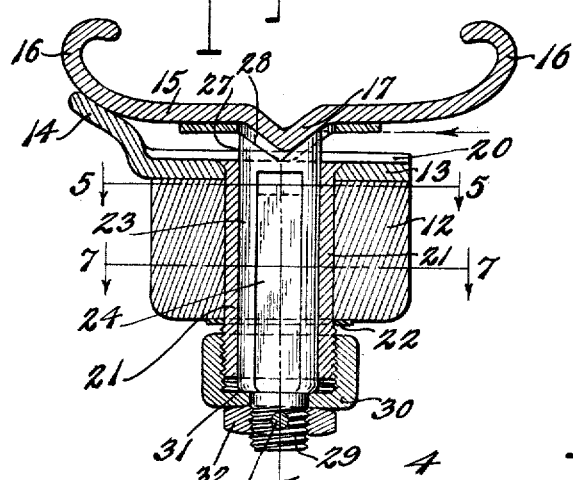
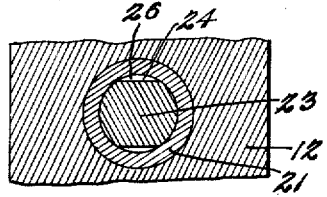
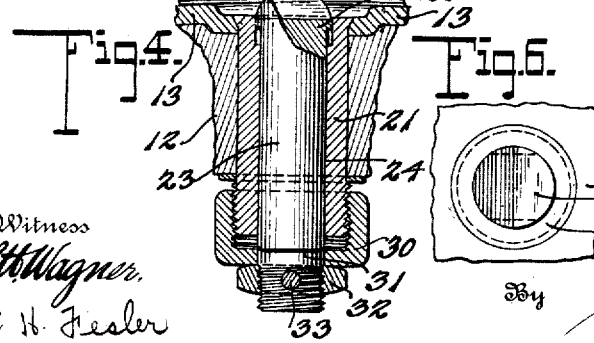
Inventor
Louis H. Perlman L. H. PERLMAN.
WHEEL.
APPLICATION FILED FEB. 23, 1917.
1,307,268.
Patented June 17, 1919.
3 SHEETS—SHEET 3.
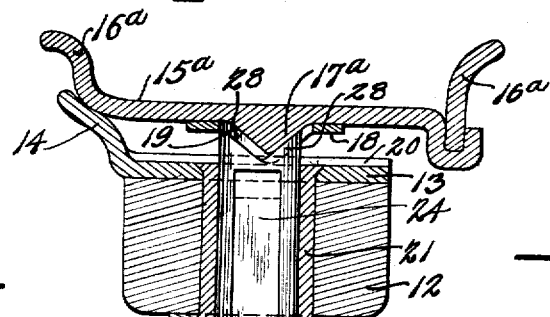
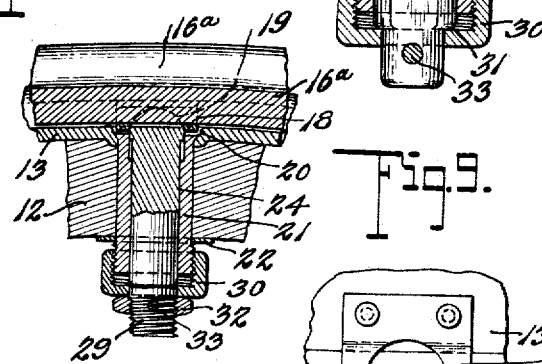
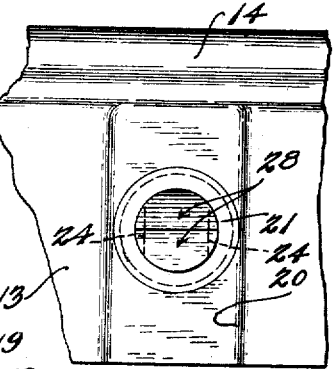
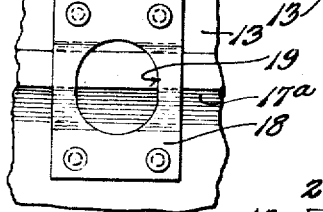
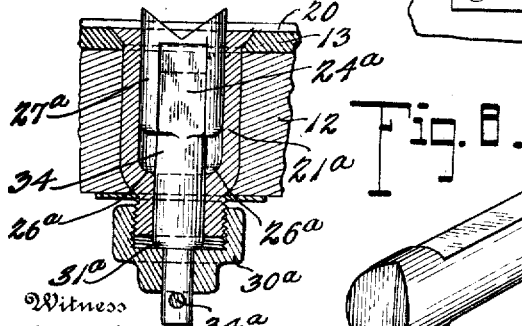
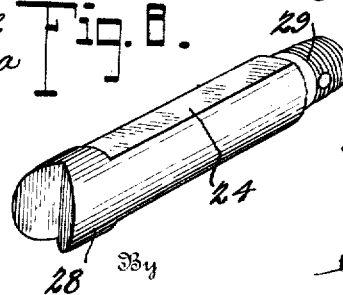
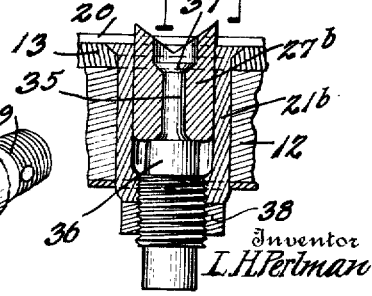
Inventor
L. H. Perlman

UNITED STATES PATENT OFFICE.

LOUIS H. PERLMAN, OF NEW YORK, N. Y.

WHEEL.

1,307,268.   Specification of Letters Patent.   Patented June 17, 1919.

Application filed February 23, 1917. Serial No. 150,487.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to the construction of wheels, particularly of the carrier type for automobiles, and the like, and refers more particularly to means for securing demountable rims on the wheel bodies.

An object is to provide a relatively simple securing means for effectively tensioning and holding a demountable rim upon a wheel body; and to provide a peculiar construction and arrangement of the driver which may be engaged with said securing means to hold the demountable rim from angularly creeping on the wheel body.

Another object is to provide a demountable rim with a substantially transversely extending cam face; and to provide a wheel body with a movable wedge having a flat cam face for contact with the cam face of the rim to tension and hold the latter against the supporting stop flange of the wheel body, and thus retain the rim in position.

The above, and various other objects and advantages of this invention will be in part described and in part understood from the following detailed description of the present preferred embodiment of the invention, the same being illustrated in the accompanying drawings, wherein:—

Fig. 2 is a fragmentary, enlarged, perspective view of a portion of the demountable rim, showing the inner side thereof, and a driver constructed and applied to the rim in accordance with this invention.

Fig. 3 is an enlarged section taken through the outer or peripheral portion of a wheel body in a substantially diametrically extending plane including the axis of the hub, and the demountable rim mounted thereon, showing the means of this invention partly in elevation.

Fig. 4 is a fragmentary sectional view of the same taken at substantially right angles axially of Fig. 3, the demountable rim being removed.

Fig. 5 is a fragmentary transverse section through the wheel body on the line 5—5 of Fig. 3, showing the radially movable element and the bearing sleeve with the stop shoulder therefor.

Fig. 6 is a fragmentary peripheral face view of the wheel body, showing the radially movable element mounted therein.

Fig. 7 is a fragmentary transverse section through the wheel body on the line 7—7 of Fig. 3, showing the retaining means for holding the radially movable element from turning in the sleeve.

Fig. 8 is a detail perspective view, enlarged of the radially movable element, showing the flat wedge carried on the outer end thereof.

Fig. 9 is a fragmentary, inner face view of the demountable rim with the driver attached thereto.

Fig. 10 is a fragmentary peripheral face view of the wheel body, showing the seat in the fixed rim for the reception of the driver.

Fig. 11 is a section similar to Fig. 3, showing a slightly modified form of the rim and the securing element therefor.

Fig. 12 is a fragmentary section on a reduced scale, through the structure of Fig. 11, taken axially at right angles thereto.

Fig. 13 is a view similar to Fig. 11 with the demountable rim removed, disclosing a modified form of the rim securing element applied thereto.

Fig. 14 is a similar view disclosing a further modified form of the rim securing element.

Figure 1:
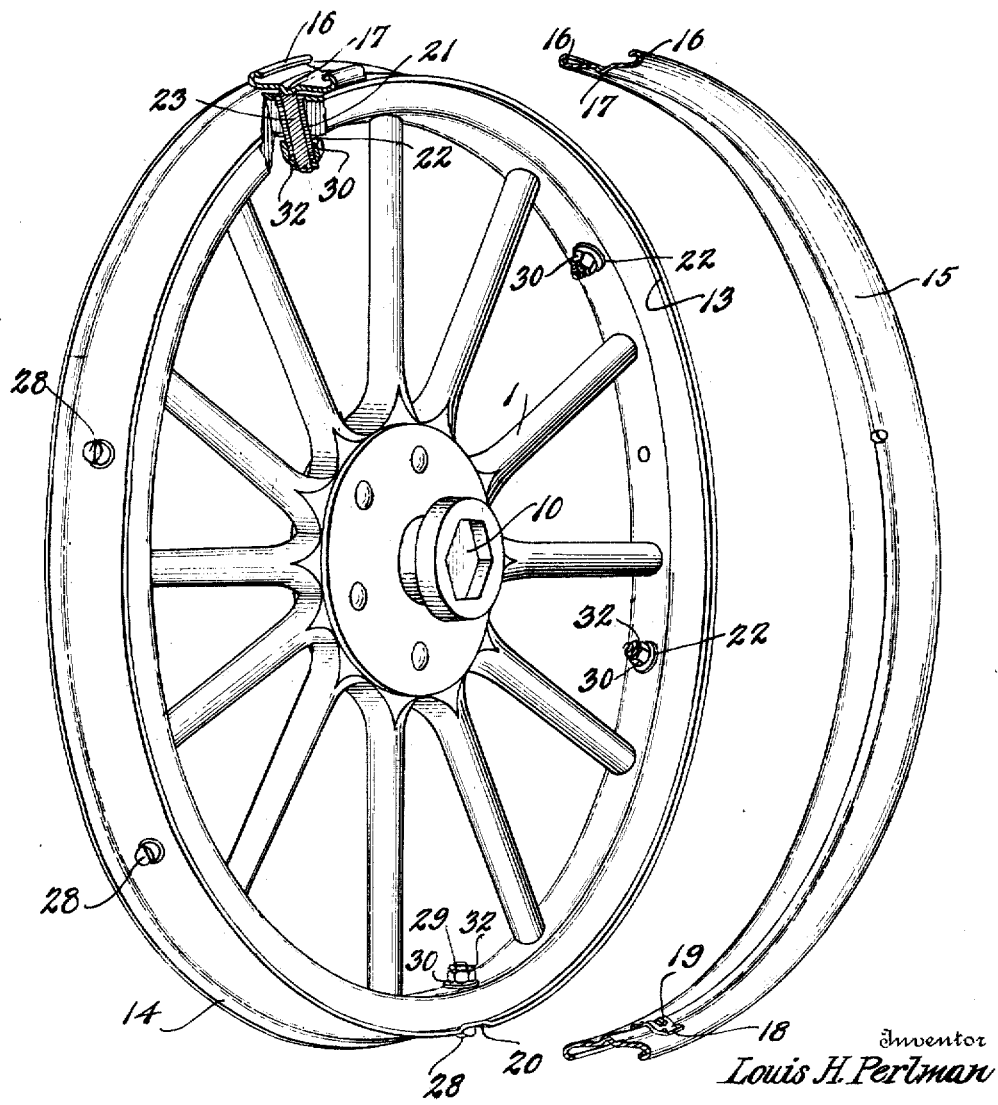
Figure 1 is a perspective view of a wheel body and a portion of a demountable rim detached therefrom, embodying the features of this invention.

Referring to these drawings, the wheel body comprises a hub 10, spokes 11 radiating from the hub, a felly 12 supported on the outer ends of the spokes and a fixed rim or felly band 13. The felly band 13 is provided at one edge with a supporting stop flange 14 adapted to receive thereagainst a demountable rim 15 of substantially the usual construction.

The demountable rim 15 has at its opposite edges tire engaging flanges 16 of any suitable type, and which are disclosed in Figs. 1, 2, and 3 as of the plain clencher type. The demountable rim 15 is provided with an annular inwardly pressed bead or projection 17 formed midway between the lateral edges of the rim, and which is substantially V-shaped in cross section, as clearly shown in Figs. 2 and 3. This projection 17 is preferably formed in the body strip of the rim 15 when the latter is cold rolled, as in the formation of the tire engaging flanges. The demountable rim 15 is provided, at a suitable point and against its inner face, with a driver 18 in the form of a metallic plate which is secured transversely across the inner side of the rim 15, and which is arched at its intermediate portion for engagement about the projection 17. The plate or driver 18 has a socket opening 19 stamped or otherwise suitably formed in the intermediate portion of the plate to expose the underlying part of the projection 17. A transversely extending recess or seat 20 is formed in the fixed rim 13 and around one of the locking elements. This seat 20 is adapted to register with and receive the apex of the arch of the driver 18.

The wheel body is provided with rim locking elements appropriately and preferably uniformly spaced about its periphery for engagement with the demountable rim 15 for locking the latter in operating position. The number of such locking elements will vary with the size of the wheel and load to be distributed. Five will be found adequate for the average pleasure car wheel, and a greater or less number may be used as conditions may require. The wheel body is provided with a bearing sleeve 21 for each locking element, the sleeve extending substantially radially through the felly 12, and being headed or otherwise suitably anchored in the felly band 13 with the outer end of the sleeve countersunk in and lying flush with the outer face of the felly band 13. The inner end of the sleeve 21 projects beyond the felly 12, and is externally screw-threaded. A wear plate 22 surrounds the inner end of sleeve 21 and is fixed to the felly 12. The sleeve 21 has little or no tendency to move radially outward owing to the fact that the balance of the stresses is practically constantly inward.

The locking element is preferably in the form of a shaft 23 mounted to move radially in the sleeve 21, and provided with diametrically opposed flat guiding faces 24 for sliding contact with the correspondingly formed flat walls 25 in the opposite sides of the sleeve 21. The flat walls 25 terminate short of the outer end of the sleeve 21 and provide stop shoulders 26 adapted to receive thereagainst the projecting rounded portions of the head or outer end 27 of the shaft. The head 27 is in the form of a wedge which is held from turning by the flat sides 24 of the shaft 23. The head 27 is provided with a transversely extending substantially V-shaped recess in its outer end adapted to receive therein the V-shaped projection 17 of the demountable rim, the recess in the head 27 providing a pair of diverging flat cam faces 28, the outer one arranged to engage flat against the inclined outer side of the projection 17. The head 27 of the shaft 23 which projects through the recess or seat 20 in the wheel body is adapted to engage in the socket opening 19 of the driver plate 18 to hold the rim 15 from creeping angularly on the wheel body. The plate 18 thus forms a driver for transmission of power between the demountable rim and wheel body. The shafts 23 may be withdrawn outwardly from the sleeves 21 and turned axially to interchange the positions of the flat wedge or cam faces 28, the latter in each instance being diverged sufficiently to engage one at a time with the outer side of the projection 17. The inner end of the shaft or movable element 23 is reduced to form a shank 29 upon which is rotatably mounted a cap nut 30 for threaded engagement over the projecting end of the sleeve 21. Shoulders 31 are formed on the shaft 23 to receive the cap nut 30 thereagainst, and the shank 29 is threaded at its end to receive a retaining nut 32, locked thereon against the cap nut 30 by means of a pin 33. The shoulders 31 and the nut 32 form a swivel connection for the cap nut 30 upon the inner end of the shaft 23.

In the form illustrated in Figs. 11 and 12 of the drawings, the demountable rim 15<sup>a</sup> is shown as having straight side tire flanges 16<sup>a</sup>, although my approved form of flange may, of course, be employed. The rim 15<sup>a</sup> is provided, intermediate its edges, with an annular ridge or projection 17<sup>a</sup> which, in this instance, is preferably formed by the enlargement of the stock during the initial formation thereof. The projection 17<sup>a</sup> is preferably of the same exterior contour as the projection 17, shown in Fig. 3, and is adapted for engagement by one side of the flat faces of the wedges 27.

The form shown in Fig. 13 embodies a sleeve 21<sup>a</sup> which is fitted in the wheel body as above described, but which is reduced in diameter at its inner end to provide stop shoulders 26<sup>a</sup> adapted to engage and support the inner end of the wedge 27<sup>a</sup>. The wedge 27<sup>a</sup> is adapted to fit in the bore of the sleeve 21<sup>a</sup> and is held from turning therein by the flat faces 24<sup>a</sup>, in the manner above set forth. The wedge 27<sup>a</sup> may comprise the outer portion of a two part shaft, the inner portion 34 of which slidably engages through the reduced inner end of the sleeve. The wedge portion 27<sup>a</sup> may have an axial opening in its inner end to receive the outer end of the inner portion 34 to hold the parts of the shaft together. In this instance the inner end of the shaft is reduced to form a shoulder 31<sup>a</sup> and to receive a cap nut 30<sup>a</sup> for engagement against the shoulder and upon the threaded inner end of the sleeve.

The cap nut 30ᵃ is retained in position by a transverse pin 23ᵃ carried by the stem and engaging the inner end of the cap.

The form shown in Fig. 14 embodies a sleeve 21ᵇ which is not only reduced in diameter at its inner end, but which is also internally threaded thereat. The wedge 27ᵇ is of substantially the same form as disclosed in Fig. 13, with the exception that the wedge 27ᵇ has an axial opening to receive the reduced stem 35 carried upon the outer end of the inner portion 36 of the shaft. The wedge 27ᵇ is counterbored at its outer end to receive the headed extremity 37 of the stem 35 and unite the two sections of the shaft together. The inner portion 36 of the shaft is externally threaded for engagement through the internally threaded inner end of the sleeve 21 and is adapted to be turned to move the non-rotatable wedge 27ᵇ radially through the wheel body. The stem 35 is adapted to turn freely in the wedge to permit this adjustment. A jam nut 38 may be mounted on the threaded inner end of the shaft section 36 and turned up against the inner end of the sleeve 21ᵇ for locking the shaft in adjusted position.

In all forms of the invention, the shaft 23 is moved radially through the wheel body to advance the wedge 27 thereof against the inner face of the rim 15. As the projection 17 has opposite inclined faces, the rim 15 may be fitted from either side upon the wheel body, and the rim engages the stop flange 14 prior to the movement of the projection 17 into axial alinement with the shaft. The outer inclined or cam face of the projection 17 is brought into registry with the outer flat face 28 of the wedge, as the latter is held from turning in the sleeve 23, and when the wedge is moved radially outward the wedge binds the demountable rim 15 against the stop flange 14. Any desired number of the shafts 23 may be employed, and the rim 15 so adjusted on the wheel body with the driver 18 opposite the seat 20, so that when the adjacent wedge 27 is moved outwardly it enters the socket opening 19 of the driver and holds the rim 15 from moving circumferentially upon the wheel body.

It is of course understood that various other modifications and changes, than as above pointed out, may be made without departing from the spirit of this invention, the same being restricted only by the scope of the following claims.

What I claim is:—

1. The combination with a wheel body, and a demountable rim therefor, having a flat inclined portion, of means for securing the rim on the wheel body comprising a radially movable element mounted on the wheel body and having an inclined flat face on its outer end for engagement with said flat inclined portion of the rim forming the sole rim-sustaining engagement of the radially movable element with the rim to hold the rim in operative position on the wheel body.

2. The combination with a wheel body, and a demountable rim therefor, of means for securing the rim on the wheel body comprising a driver plate secured to the inner face of the rim and having a portion thereof spaced from the inner face of the rim and being apertured thereat to provide a socket opening, and a radially movable element carried by the wheel body for engagement in said socket.

3. The combination with a wheel body, and a demountable rim therefor, of means for securing the rim on the wheel body comprising a projection on the inner face of the rim, a driver plate secured to the inner face of the rim and engaging over said projection and having an opening therethrough, and a radially movable wedge mounted on the wheel body and adapted for engagement through the opening in said driver plate and with the projection beneath the plate whereby said wedge is adapted to hold the rim in place and prevent the rim from creeping about the wheel body.

4. The combination with a wheel body, of a demountable rim and means for locking the rim to the wheel body comprising a projection upon the inner face of the rim, said projection being substantially V-shaped in cross section, a driver plate extending transversely across the inner face of said rim and being bent at its intermediate portion to conform to the curvature of the projection, said plate being provided at its bent portion with a socket opening, and a radially movable element carried by the wheel body and adapted for engagement through the socket opening of the driver plate and for contact with said projection.

In testimony whereof I affix my signature in presence of two witnesses.

LOUIS H. PERLMAN.

Witnesses:
  I. B. LEIBSON,
  EDGAR M. KITCHIN.